T. A. WILLARD.
STORAGE BATTERY.
APPLICATION FILED MAY 12, 1915.
1,224,434. Patented May 1, 1917.
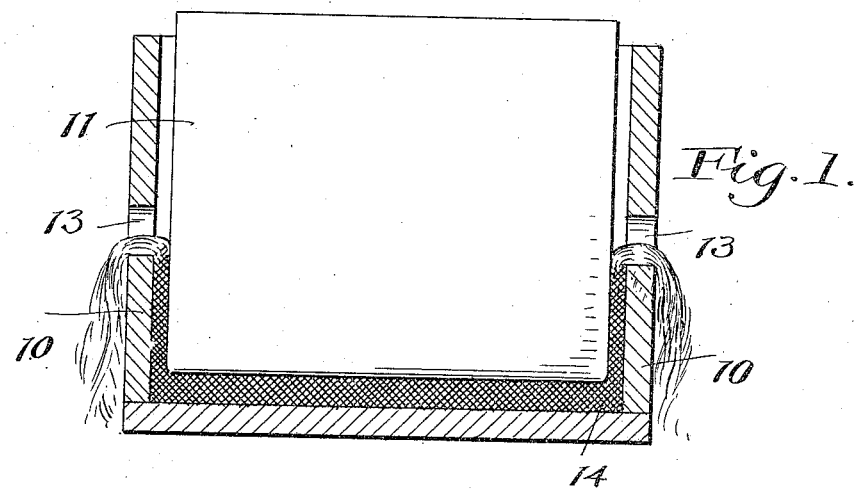
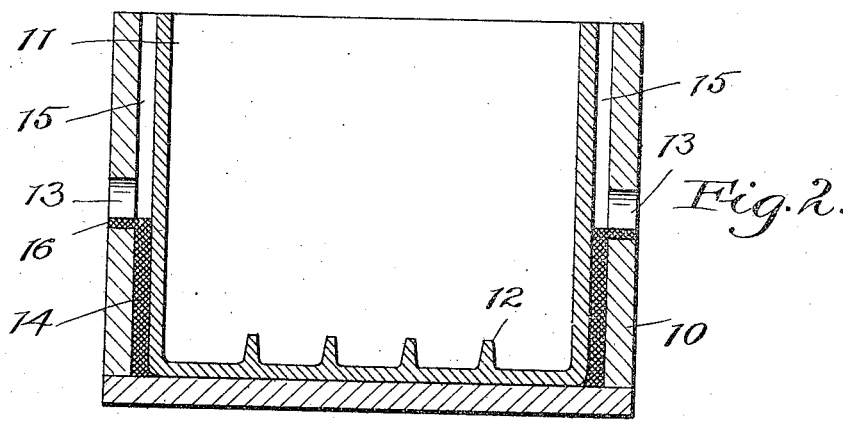
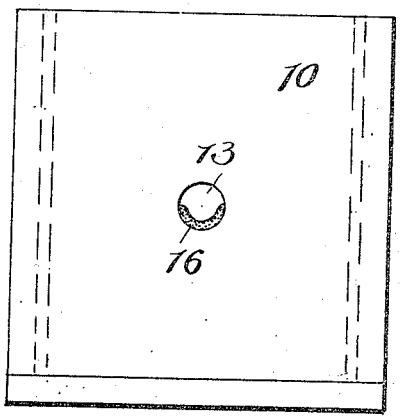

UNITED STATES PATENT OFFICE.

THEODORE A. WILLARD, OF CLEVELAND, OHIO, ASSIGNOR TO WILLARD STORAGE BATTERY COMPANY, OF CLEVELAND, OHIO, A CORPORATION OF WEST VIRGINIA.

STORAGE BATTERY.

1,224,434. Specification of Letters Patent. Patented May 1, 1917.

Application filed May 12, 1915. Serial No. 27,481.

*To all whom it may concern:*

Be it known that I, THEODORE A. WILLARD, a citizen of the United States, and resident of Cleveland, in the county of Cuyahoga and State of Ohio, have invented a certain new and useful Improvement in Storage Batteries, of which the following is a full, clear, and exact description.

This invention relates to storage batteries and to a method of sealing the jar and battery box.

One of the objects of this invention is to seal the jar in the battery box in such a manner that an air space is provided around the top of the cell or jar for ventilation, and at the same time the cell is held securely in the box.

A further object is to seal the jar in the box in such a manner that if the battery is overfilled or overflows there will be good drainage and still the acid cannot soak into the wood surrounding the openings provided for drainage and ventilation.

The above and other objects are attained by my invention, which may be briefly summarized as consisting in certain novel combinations and arrangements of parts and steps of the method which will be described in the specification and set forth in the appended claims.

In the accompanying sheet of drawings Figure 1 is a sectional view through the battery box showing the manner in which the bottom of the cell is sealed in the box; Fig. 2 is a similar view showing both the box and jar of the cell in vertical section with the jar sealed in the box; Fig. 3 is an end view of the box.

I have shown one embodiment of my invention in the drawings, in which 10 represents the battery box which is usually formed of wood, and which is rendered acid proof by painting with acid proof paint or by otherwise treating the same. This battery box receives one or more cells, usually a plurality of the cells, each of which includes a jar 11 adapted to contain the battery solution and the usual positive and negative battery plates which are supported on upstanding flanges 12. To securely seal or hold the jar or jars 11 in the box 10, and at the same time provide better ventilation than has heretofore been obtainable around the outside of the jar or between the upper portion of the jar and the box, I form in the walls of the box ventilating and drainage openings 13 which are provided at a predetermined distance from the bottom of the box. I then place in the box, before the jars are lowered in the same, a melted sealing compound 14 having an asphaltum or pitchy base, the box being filled to a depth such that when the jars are lowered into the box the sealing compound will run out of the openings 13. The jars are then placed in the box, and by means of a suitable weight which will be placed on the jars the latter will be forced down to the bottom of the box, as shown in Fig. 2, displacing the sealing compound and causing a certain portion to flow out through the openings 13. The jars which are smaller in dimensions than the inside dimensions of the box, when lowered, are spaced from the walls of the box, as shown in the drawings. Then, when the jars rest firmly on the bottom of the box, the compound is allowed to cool and set or become hardened, after which the droppings are cleaned off the outside of the box.

In this manner the jars are securely sealed and held rigidly in the box, but at the same time there is a ventilating space 15 provided around the upper portion of each jar, which admits of the circulation of air around that part of the jar which in practice becomes the hottest, cool air entering the openings 13 and the heated air passing upward from the ventilating spaces 15. Furthermore, if the battery is overfilled, as is often the case in practice, the battery solution will run down into the spaces 15 to the sealing compound and out through the openings 13. By reason of the fact that the sealing compound was previously allowed to overflow or run out of the openings 13, a coating of this compound overlies the lower part of each opening 13, as shown at 16 in Fig. 2, with the result that the acid cannot soak into the wall of the opening.

Having thus described my invention, what I claim is:—

1. In a storage battery, a battery box, one or more battery jars contained in the box and spaced from the side walls thereof, and a sealing compound filling the space between the jar or jars and the side walls of the box for a predetermined distance up from the bottom of the box, there being an overflow and ventilating space between the sealing compound and the top of the box.

2. In a storage battery, a battery box, a plurality of jars in the box and spaced from the side walls thereof, said box having openings in its side walls, a sealing compound securing the jars in the box and filling the space around the jars from the bottom of the box to said openings, the space between the jars and the box above said openings being open for overflow and ventilation purposes.

In testimony whereof, I hereunto affix my signature in the presence of two witnesses.

THEODORE A. WILLARD.

Witnesses:
    A. J. HUDSON,
    L. I. PORTER.